Figure 1:
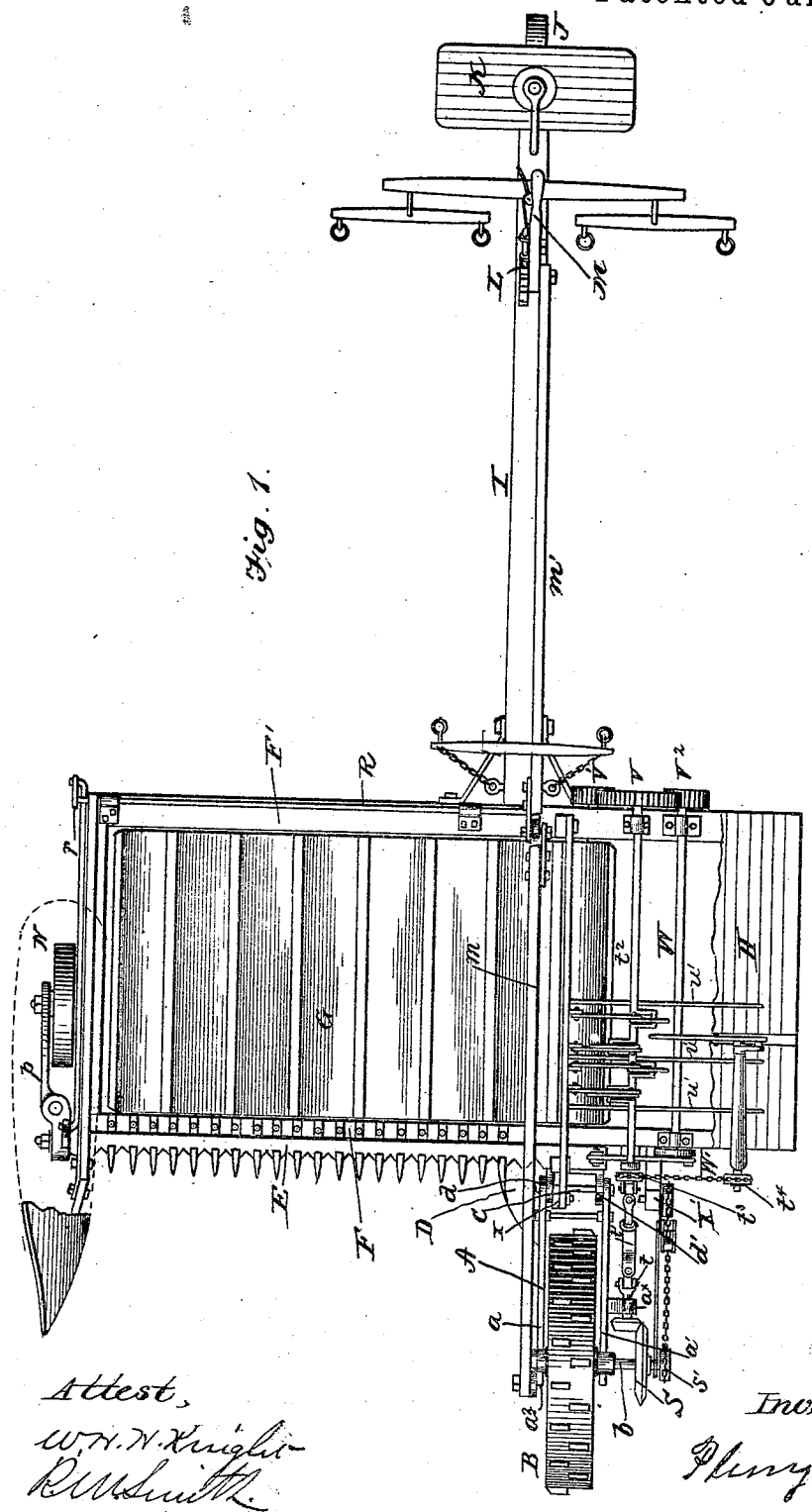

(No Model.)

2 Sheets—Sheet 1.

P. F. HODGES.
HARVESTING MACHINE.

No. 321,813.

Patented July 7, 1885.

Attest,
W. H. N. Knight
R. W. Smith

Inventor,
Pliny F. Hodges

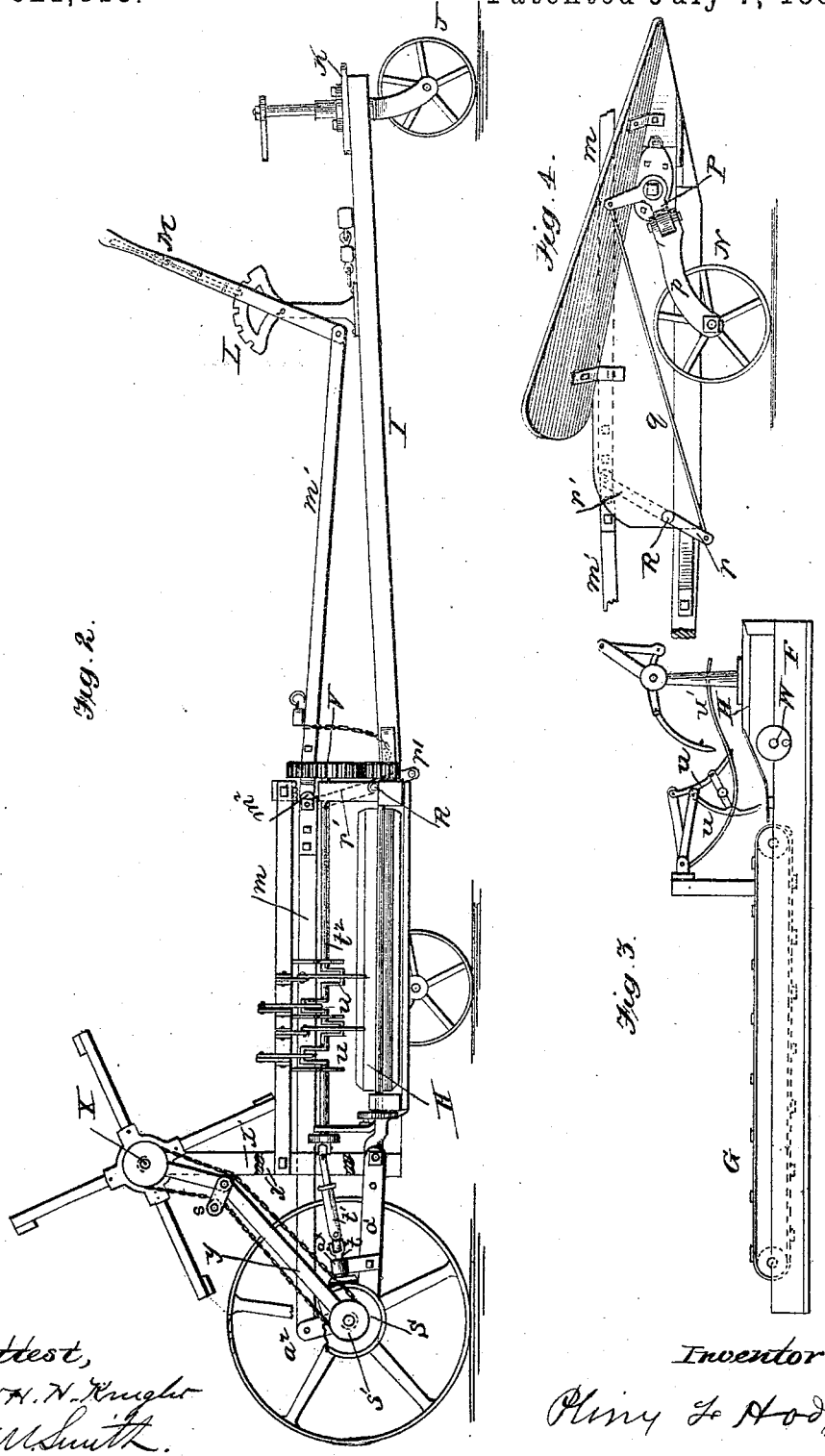

UNITED STATES PATENT OFFICE.

PLINY F. HODGES, OF DAVENPORT, IOWA.

HARVESTING-MACHINE.

SPECIFICATION forming part of Letters Patent No. 321,813, dated July 7, 1885.

Application filed October 29, 1881. (No model.)

*To all whom it may concern:*

Be it known that I, PLINY F. HODGES, of Davenport, county of Scott, State of Iowa, have invented new and useful Improvements in Harvesting-Machines, of which the following is a full, clear, and exact description, reference being had to the accompanying drawings, making part of this specification, in which—

Figure 1 is a plan or top view of my improved harvesting-machine; Fig. 2, a side elevation of the same, taken from the stubble side; Fig. 3, a front elevation of the grain-platform and binder-table, the gear-frame, cutting apparatus, &c., being removed to show the relation of the platform, binder-table, &c., and Fig. 4, a side elevation of the grain side of the grain-platform and its carrying-wheel.

My invention, which I here illustrate as applied to that species of low-down self-binding harvesters known as "rear-cut thrust-machines," but which may be applied to other styles of low-down self-binding harvesters, consists in organizing the machine with alternately-thrusting packers which are independent of the platform-carrier, taking the grain delivered thereby to pack it in a gavel on the low-down binder-table.

In the accompanying drawings, A represents the drive-wheel frame, which may be of any suitable form or construction, that shown consisting of parallel bars or plates $a\ a,'$ rigidly connected in any convenient way at their rear ends and provided at their forward ends with sleeves or bearings for the axle $b$ of the main drive-wheel B, arranged between them, as shown. The rear ends of the bars $a\ a'$ have a bolt passing through them, which passes also through lugs or ears $d\ d'$, formed either on the shoe D at the inner end of the cutting apparatus or connected with the forward transverse bar of the platform, as may be preferred. By this construction it will be seen that the cutting apparatus indicated at E and the grain-platform in rear thereof are brought in rear of the driving-wheel, and while the cutting apparatus extends upon one side only of said wheel the grain-platform may be extended in the opposite direction to or beyond the vertical plane in which the driving-wheel moves, as shown.

The platform-frame F F' may be of any usual or preferred construction, according to the means employed for removing or discharging the grain therefrom. It is shown made rectangular in form and provided with rollers mounted in bearings in its front and rear transverse bars, carrying an endless apron or slatted canvas, G, which constitutes the platform-carrier, and by means of which the grain is carried to and discharged at the main drive-wheel side of the machine and behind said wheel. In the drawings this canvas is made to deposit the grain upon a low-down binder-table, H, located in the rear of the drive-wheel and in about the same horizontal plane with the upper carrying-face of the endless apron; but it will be apparent that other means may be used for removing the grain from the platform on which it falls as it is cut and that the receptacle for the grain may be of any usual or preferred form and arrangement.

The pole or tongue indicated at I is arranged in rear of the carrying-platform frame and has its forward end, in the construction shown, rigidly connected therewith, said tongue being supported at its rear end upon a swiveling guiding truck or wheel, J, of any usual or preferred form and arrangement.

The tongue is provided at its rear end with a seat or stand, K, for the driver, and in front thereof with a rack-standard, L, supporting a lever, M, through which the height of the cutting apparatus is adjusted, as follows: To the lower short arm of this lever M is connected the rear end of a jointed rod, $m\ m'$, which extends forward over the inner end of the carrying platform or apron G, its forward end being connected with the upper end of a lever or angular extension, $a^2$, formed on or attached to the forward end of the bar $a$ of frame A above the bearing for the drive-wheel axle therein. The tongue being connected rigidly with the platform-frame, and the latter being hinged at its forward edge to the rear end of the wheel-frame A, as explained, it will be seen that when the lever M is drawn back by the attendant, its lower end moving in a reverse direction, acts through the rod $m\ m'$ to crowd the lever-arm $a^2$ forward, and thereby to lift the rear end of frame A, and with it the platform and forward end of the tongue, vibrating them upon the rear carrying truck or wheel, J. The frame A vibrating upon the axle of the driving-wheel B as a center, a reverse movement of the lever depresses the frame A, and with it the cutting apparatus and platform. When the proper adjustment has been effected, lever M is locked to the rack, so that then the main frame and the tongue are rigidly connected by the aforesaid levers and rods, which then sustain part of the thrust transmitted from the tongue to the main frame and driving-wheel.

The outer or grain side of the platform is supported upon a carrying-wheel, N, made in the present instance in the form of a caster-wheel, the swiveling supporting-arm $p$ of which is pivoted to one arm of a bell-crank lever, P, supported upon a suitable bracket or arm formed upon or secured to the outer shoe or divider, or to the divider-board at the outer end of the platform, as shown in Fig. 4. The upright arm of this bell-crank lever has the forward end of a rod, $q$, connected with it, the opposite end of said rod being pivoted to a pendent arm, $r$, of a transverse rock-shaft, R, mounted in suitable bearings on the rear platform frame-bar F'. The inner end of this rock-shaft, terminating about in the vertical longitudinal plane of the jointed connecting-rod $m\ m'$, is provided with an upright arm, $r'$, which at its upper end is connected with said rod $m\ m'$, by preference at or near the joint at $m^2$ therein, said joint providing for the movement of the arm $r'$ in the arc of a circle. By this arrangement, connecting the grain-wheel with the rod $m\ m'$ and lever L, by means of which the frame A is rocked on the driving-wheel for raising or lower the platform-frame at its inner end, it will be seen that when the lever L is vibrated for rocking the frame A upward, the movement of the lever serves, through the connections described, to rock the grain-wheel downward relatively to the outer end of the platform, and thereby to raise said end simultaneously with the raising of the inner end, and vice versa, the parts being so proportioned as to give about the same degree of adjustment at each end, and thereby to preserve the parallel relation of the cutter-bar and platform to the ground.

Other arrangements of means may be employed, if preferred; but those described serve to leave an unobstructed way for the discharge of the grain from the platform at the stubble side of the machine behind the driving-wheel and in front of the team, the connecting-rod $m$ passing sufficiently above the inner end of the apron G for that purpose, as shown.

The arrangement for driving the cutters, reel, and raking and binding mechanisms is shown as consisting of a bevel-wheel, S, and a sprocket-wheel, $s'$, on the axle, which rotates with the driving-wheel B. In suitable bearings, $a^x$, on the frame-bar $a'$ is mounted a short shaft, $t$, provided on its forward end with a bevel-pinion, which engages with and is driven by the bevel-wheel S. The rear end of shaft $t$ has a sliding or telescopic extension, $t'$, connected with it by a tumbling or universal joint, the rear end of said tumbling extension being connected in a similar manner with a shaft, $t^2$, mounted in suitable bearings on the platform-frame F F', said shaft being shown as extending lengthwise of the machine across the platform-frame above the binder-table, and provided with cranks for actuating the fingers $u$, which, overlying the grain-passage, take the grain from the delivery end of the platform-apron G, and in feeding it to the binding devices pack it in a gavel on the binder-table under the overlying presser-arms $u'$.

The shaft $t^2$ has a spur-gear, V, on its rear end, from which motion is imparted to gears V' V²—one, V', on the rear end of the shaft of the inner roller of the apron G driving the same, and the other, V², on the rear end of the crank-shaft W, said shaft extending forward underneath the binder-table, and being provided on its forward end with a crank connected by a pitman, W', with the knife-bar for actuating the same. The forward end of shaft $t^2$ is provided with a sprocket-wheel, $t^3$, and a chain extending therefrom around a similar wheel, $t^4$, on the shaft of the needle, or cord, or wire carrying arm of the binder serves to actuate the latter.

My improvements in the automatic binder will be made the subject-matter of another application, and need not, therefore, be described here; but any preferred form of binder may be employed, and the needle-arm may be arranged to operate either from beneath the binder-table, passing up through a slot therein, or it may be arranged above the table, as shown in the drawings.

The reel-shaft X is mounted in standards $x$ $x'$ at the inner end of the platform-frame, and is driven by a sprocket-chain from the sprocket-wheel $s'$ on the end of the main drive-wheel axle $b$, as shown, a jointed rod, $y$, pivoted at one end to said axle and at the other to the reel shaft, and provided with tension-pulley $s$, as shown, serving to give the proper tension to the sprocket for driving the reel under all the different adjustments of the platform-frame and reel.

I have described how the cutter-bar, raking and binding mechanisms, and reel may be actuated from the main driving-wheel, arranged in the described relation to said mechanisms; but it will be apparent that the form and arrangement of the mechanism for gearing back from said wheel may be varied so long as an unobstructed passage-way is preserved behind said wheel and in front of the tongue for the discharge of the grain outside of the path of said wheel, and of the team propelling the machine. In Fig. 1 the binder-table is shown partly broken away to show the arrangement of the driving mechanism described, and in Fig. 2 the reel-shaft is broken away for a similar purpose, as are also parts of the wheel B and reel-post $x$ in the same figure, and the cutting apparatus, &c., in Fig. 3, in order to better show the arrangement of the other parts referred to.

A single drive-wheel also has been described; but it will be apparent that an ordinary rear-cut two-wheel mowing-machine truck may be substituted for the single-wheel arranged in the described relation to the cutting apparatus, carrying-platform, and tongue, and, if desired, said truck may be made detachable and used for mowing-machine purposes.

From the foregoing description it will be apparent that the several means for actuating the cutter, reel, raking and binding mechanisms, and said mechanisms themselves, may be varied so long as the distinctive features of arrangement of the cutting apparatus and platform intermediate the driving wheel or wheels in front, and the tongue in rear thereof in a thrust-machine is preserved, and a passage-way is left between the wheel and tongue under such arrangement for the discharge of the grain or bound bundles across and outside of the path of the driving-wheel, and of the team propelling the machine. By this arrangement the necessity of elevating the grain over the wheel is obviated. The grain can be delivered to the binding devices arranged about on the same level with the carrying-platform, and connected with the inner end thereof behind the driving-wheel, and said binding devices can readily deposit the bound bundles upon the ground outside the path of the team behind it. Besides this, the cutting apparatus projecting laterally upon one side of the driving-wheel can be arranged to cut in close proximity to the vertical plane of the adjacent side of the driving-wheel, which cannot be done in the ordinary arrangement where the grain has to be carried up over the driving-wheel to a receptacle or to binding devices arranged upon the opposite side of said wheel.

Thus a compact arrangement of the operative parts of the machine is secured, one permitting the employment of a low-down binder and facilitating the discharge of the bundles out of the path of the machine and the team propelling it, while at the same time it locates the driver in a position enabling him to watch the movements of all the operative parts of the machine.

Parts of the machine not particularly described may be constructed in any usual or preferred way.

The term "packers" I use in its technical sense as applied in automatic grain-binders to the alternately thrusting or reciprocated and projected and retracted fingers which pack the flowing loose grain by alternate thrusts into a gavel, thrusting beyond the point where the point of the binding-arm passes through the loose grain. I am well aware that such packers have been in use for some time to operate on grain first elevated over the drive-wheel of the harvester and delivered to a binder table or deck on the outside or stubble side of such drive-wheel; but I am the first, so far as I know, to apply such packers to a low-down binder, and by such application of packers I have very materially improved the operation and practical usefulness of low-down binders. I do not claim herein, broadly, alternately-thrusting packers on low-down binders, since they are claimed, broadly, in that connection in my application for a United States Patent filed November 10, 1880, No. 20,349. The distinguishing feature here as regards the packers is that they are independent of the platform-carrier.

Having now described my invention, I claim—

1. The combination, substantially as before set forth, of the horizontal platform-carrier, the low-down binder-table, and independent alternately-thrusting packers, which take the grain delivered by the platform-carrier and pack it in a gavel on the binder-table.

2. The combination, substantially as before set forth, of the horizontal platform-carrier, the low-down binder-table, and overlying independent alternately-thrusting packers, which take the grain delivered by the platform-carrier and pack it in a gavel on the binder-table.

In testimony whereof I have hereunto set my hand this 28th day of October, A. D. 1881.

PLINY F. HODGES.

Witnesses:
H. B. ZEVELY,
R. W. SMITH.